United States Patent Office.

JOHN SHAPLEY AND A. D. HUTCHINSON, OF ROSEFIELD, ILLINOIS.

Letters Patent No. 92,107, dated June 29, 1869.

IMPROVED MEDICINE OR CORDIAL.

The Schedule referred to in these Letters Patent and making part of the same.

*To all whom it may concern:*

Be it known that we, JOHN SHAPLEY and A. D. HUTCHINSON, of Rosefield, in the county of Peoria, and in the State of Illinois, have invented a new and useful Medical Compound for an "Alterative and Invigorating Cordial;" and do hereby declare that the following is a full, clear, and exact description of the ingredients forming the compound, the quantities of each, and the manner of compounding, making, and using the same, viz, the ingredients, and their respective quantities:

Root of the *Cimicifuga*, (bruised,) half an ounce.
The plant *Scutellaria lateriflora*, three drachms.
Root of the *Hydrastis Canadensis*, (pulverized,) half a drachm.
Root of the *Veratrum viride*, (bruised,) half a drachm.
Root of the *Myrica cerifera*, (pulverized,) one drachm.
Seed of the *Capsicum*, (pulverized,) twelve grains.
*Aurantii cortex*, (ground,) two drachms.
Bark of the *Cinnamomum*, (ground,) one drachm.
Seed of *Carum*, (bruised,) one drachm.
Seed of *Coriandrum*, (bruised,) one drachm.
Seed of *Anisum*, (bruised,) one drachm.

Alcohol, (specific gravity 0.825,) or pure spirits, two quarts.
Pure soft water, four quarts.

The whole of the above ingredients are macerated for fourteen days; then express and filter, and bottle it for use, coloring it, if wished, with burned sugar.

The dose for an adult person is from one-half to one wineglassful, three times a day.

The medicine acts on the system as an alterative and tonic, or invigorating cordial.

Having thus fully described our invention,
What we claim as new, and desire to secure by Letters Patent, is—

The alterative and invigorating cordial, prepared and compounded, and to be used substantially as described.

In testimony that we claim the foregoing "alterative and invigorating cordial," we have hereunto set our hands, this 17th day of May, 1869.

JOHN SHAPLEY.
A. D. HUTCHINSON.

Witnesses:
JOHN DEARBORN,
HENRY W. WELLS.